United States Patent
Ahmed et al.

(10) Patent No.: US 12,316,770 B2
(45) Date of Patent: May 27, 2025

(54) BLOCKCHAIN BASED FACIAL ANONYMIZATION SYSTEM

(71) Applicant: Telefonaktiebolaget LM Ericsson (publ), Stockholm (SE)

(72) Inventors: Talal Ahmed, Frankfurt am Main (DE); Nevena Tusheva, Frankfurt am Main (DE); Dimitar Pramatarov, Neu-Isenburg (DE); Jörg Niemöller, Sollentuna (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 385 days.

(21) Appl. No.: 17/756,395

(22) PCT Filed: Nov. 25, 2019

(86) PCT No.: PCT/SE2019/051189
§ 371 (c)(1),
(2) Date: May 24, 2022

(87) PCT Pub. No.: WO2021/107826
PCT Pub. Date: Jun. 3, 2021

(65) Prior Publication Data
US 2023/0034519 A1 Feb. 2, 2023

(51) Int. Cl.
*H04L 9/32* (2006.01)
*G06V 40/16* (2022.01)
(52) U.S. Cl.
CPC .......... *H04L 9/3239* (2013.01); *G06V 40/161* (2022.01); *G06V 40/169* (2022.01); *G06V 40/172* (2022.01)

(58) Field of Classification Search
USPC ........................................................ 382/118
See application file for complete search history.

(56) References Cited

U.S. PATENT DOCUMENTS 9,396,354 B1 7/2016 Murphy et al.
2011/0135168 A1 6/2011 Hosoi
(Continued)

FOREIGN PATENT DOCUMENTS

CN 107273796 A 10/2017
WO WO-2018201009 A1 * 11/2018 ............. G06F 21/00

OTHER PUBLICATIONS

Supplementry European Search Report and Search Opinion, EP App. No. 19954445.3, Jul. 21, 2023, 13 pages.
(Continued)

*Primary Examiner* — Jacky X Zheng
(74) *Attorney, Agent, or Firm* — Nicholson, De Vos, Webster & Elliott, LLP (57) ABSTRACT

A method by one or more network devices executing one or more smart contracts stored in a blockchain for anonymizing faces appearing in digital media content. The method includes obtaining, for each of a plurality of users, a facial model associated with that user, obtaining digital media content digital media content, determining whether that detected face matches the face of any of the plurality of users based on applying one or more of the facial models associated with the plurality of users to that detected face, anonymizing that detected face to generate an anonymized face in response to a determination that that detected face matches the face of one of the plurality of users, and providing the anonymized face to the media platform.

20 Claims, 4 Drawing Sheets

(56) References Cited

U.S. PATENT DOCUMENTS

| | | | |
|---|---|---|---|
| 2014/0086493 A1 | 3/2014 | Kothari | |
| 2015/0113661 A1 | 4/2015 | Mishra | |
| 2016/0294781 A1 | 10/2016 | Ninan et al. | |
| 2017/0017833 A1 | 1/2017 | Watanabe et al. | |
| 2017/0091570 A1 | 3/2017 | Rao et al. | |
| 2017/0193369 A1* | 7/2017 | Ferrell | G06N 3/006 |
| 2018/0189552 A1 | 7/2018 | Barnett et al. | |
| 2019/0035059 A1* | 1/2019 | Le Jouan | G06T 11/60 |
| 2019/0165949 A1* | 5/2019 | Ramos | G06F 21/6254 |
| 2022/0172517 A1* | 6/2022 | Kuta | H04L 63/0421 |

OTHER PUBLICATIONS

Bohannon, John, "Facebook will soon be able to ID you in any photo", Available Online at <https://www.sciencemag.org/news/2015/02/facebook-will-soon-be-able-id-you-any-photo>, Feb. 5, 2015, pp. 1-11.

International Search Report and Written Opinion, PCT App. No. PCT/SE2019/051189, Aug. 21, 2020, 12 pages.

Ivan, D., "Moving Toward a Blockchain-based Method for the Secure Storage of Patient Records", downloaded from <https://healthit.gov/sites/default/files/9-16-drew_ivan_20160804_blockchain_for_healthcare_final.pdf>, Aug. 31, 2016, pp. 1-11.

Ochoa, et al., "Privacy in the Internet of Things: A Study to Protect User's Data in LPR Systems Using Blockchain", IEEE, Aug. 26, 2019, pp. 1-5.

Office Action, EP App. No. 19954445.3, Sep. 27, 2024, 06 pages.

* cited by examiner

BLOCKCHAIN BASED FACIAL ANONYMIZATION SYSTEM

CROSS-REFERENCE TO RELATED APPLICATIONS

This application is a National stage of International Application No. PCT/SE2019/051189, filed Nov. 25, 2019, which is hereby incorporated by reference.

TECHNICAL FIELD

Embodiments of the invention relate to the field of data anonymization, and more specifically, to a blockchain based facial anonymization system.

BACKGROUND ART

A blockchain includes a continuously expanding set of blocks that are linked and secured using cryptography. In particular, every block in a blockchain may include a cryptographic hash of the immediately preceding block, a timestamp for the current block, and transaction data. A blockchain may be shared and managed through a peer-to-peer computer network in which peers verify/validate new blocks to be added to the blockchain such that a block in a blockchain cannot be altered without alteration of all subsequent blocks, which requires network consensus. This architecture allows for security of information stored within blocks through the use of cryptography; sharing/distribution of information through the use of peer-to-peer networks; trust through the use of consensus of block addition; and immutability of information stored within blocks through the use of cryptography, chaining/linking of blocks, and peer distribution (e.g., each peer in the network may maintain a ledger of all verified/validated transactions in the network).

A smart contract is a computer protocol intended to digitally facilitate, verify, and/or enforce the negotiation or performance of a contract. With a smart contract, no third party is needed to perform credible transactions between parties because the transactions are trackable and irreversible. Smart contracts can be used for general purpose computation on a blockchain, and in this sense, it can be any kind of computer program, and need not be related to the classic meaning of a legal contract. Parties can use a smart contract not only to define the contract conditions according to which they oblige themselves to keep the defined arrangement, but they can also define what the smart contract automatically executes if the conditions are fulfilled.

Data anonymization is the process of encrypting or removing personally identifiable information from data sets so that the people/objects that the data describe/depict remain anonymous. Data anonymization is often used for privacy protection purposes. Image anonymization is a type of data anonymization that removes identifiable information from images, which often involves rendering the faces appearing in the image unrecognizable. This can be done by blurring the face, substituting the face with a synthetic face, and/or blending the face with the surrounding background scene.

There exist a number of tools for anonymizing images. For example, there exist mobile applications that automatically anonymize images captured by the camera of the user's mobile device and/or images selected from the user's image library. The application may automatically detect and hide faces appearing in the images by overlaying the faces with playful illustrations (e.g., synthetic faces) so that those images can be shared on social media without showing the actual faces. As another example, there exists anonymizing software that can detect and blur various objects in images. For example, the software can detect faces, car license plates, and/or other types of objects in images and apply blurring filters to those objects to render those objects unrecognizable/unreadable. Such software is often used for anonymizing street view images, webcam images, and other images where privacy is a concern.

With the anonymization approaches mentioned above, however, the owner/uploader of the image/video is the one who controls which images/videos are being anonymized and what/who gets anonymized in those image/video. The other persons appearing in the image/video (persons that are not the owner/uploader of the image/video), have little to no editorial control over the images/videos. Thus, a person's face can appear in images/videos shared/uploaded by others in the public space (e.g., on social media or video sharing platforms), sometimes even without the person knowing that his/her face appears in those images/videos, thereby compromising the person's identity/privacy. This can happen accidentally (e.g., in the case of touristic photos) or on purpose (e.g., when revealing/compromising the person's identity is aimed). More generally, this problem arises because the person only has control over images/videos that the person shares/uploads and does not have editorial control over images/videos shared/uploaded by others.

SUMMARY

Embodiments can overcome some of the disadvantages of existing anonymization approaches by allowing users to have their faces anonymized in digital media content provided by one or more media platform (e.g., even if a user is not the owner/uploader of the digital media content). Facial anonymization may be provided using blockchain technology and one or more smart contrasts to provide autonomous, transparent, and verifiable facial anonymization. An embodiment is a method by one or more network devices executing one or more smart contracts stored in a blockchain for anonymizing faces appearing in digital media content. The method includes obtaining, for each of a plurality of users, a facial model associated with that user and a profile of that user, where the facial model associated with that user is a computing model usable for detecting a face of that user, obtaining digital media content provided by a media platform, and detecting one or more faces appearing in the digital media content. The method further includes performing the following for each of the one or more detected faces: generating a profile of that detected face, determining, from the plurality of users, one or more users that have a profile that matches the profile of that detected face, determining whether that detected face matches the face of any of the determined one or more users based on applying, to that detected face, one or more of the facial models associated with the determined one or more users, anonymizing that detected face to generate an anonymized face in response to a determination that that detected face matches the face of one of the determined one or more users, and providing the anonymized face to the media platform to allow the media platform to publish the media content with the anonymized face.

Another embodiment is a network device configured to execute one or more smart contracts stored in a blockchain to anonymize faces appearing in digital media content. The network device includes a set of one or more processors and a non-transitory machine-readable storage medium having stored therein the one or more smart contracts, which when executed by the set of one or more processors, causes the network device to obtain, for each of a plurality of users, a facial model associated with that user and a profile of that user, where the facial model associated with that user is a computing model usable for detecting a face of that user, obtain digital media content provided by a media platform, detect one or more faces appearing in the digital media content, and for each of the one or more detected faces: generate a profile of that detected face, determine, from the plurality of users, one or more users that have a profile that matches the profile of that detected face, determine whether that detected face matches the face of any of the determined one or more users based on applying, to that detected face, one or more of the facial models associated with the determined one or more users, anonymize that detected face to generate an anonymized face in response to a determination that that detected face matches the face of one of the determined one or more users, and provide the anonymized face to the media platform.

Yet another embodiment is a non-transitory machine-readable medium having one or more smart contracts stored therein, which when executed by a set of one or more processors of one or more network devices implementing a blockchain, causes the one or more network devices to perform operations for anonymizing faces appearing in digital media content. The operations include obtaining, for each of a plurality of users, a facial model associated with that user and a profile of that user, where the facial model associated with that user is a computing model usable for detecting a face of that user, obtaining digital media content provided by a media platform, and detecting one or more faces appearing in the digital media content. The operations further includes performing the following for each of the one or more detected faces: generating a profile of that detected face, determining, from the plurality of users, one or more users that have a profile that matches the profile of that detected face, determining whether that detected face matches the face of any of the determined one or more users based on applying, to that detected face, one or more of the facial models associated with the determined one or more users, anonymizing that detected face to generate an anonymized face in response to a determination that that detected face matches the face of one of the determined one or more users, and providing the anonymized face to the media platform.

BRIEF DESCRIPTION OF THE DRAWINGS

The invention may best be understood by referring to the following description and accompanying drawings that are used to illustrate embodiments of the invention. In the drawings.

DETAILED DESCRIPTION

The following description describes methods, apparatus, and systems for anonymizing faces appearing in digital media content. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

As mentioned above, with existing anonymization approaches, the owner/uploader of the image/video is the one who controls which images/videos are being anonymized and what/who gets anonymized in those image/video. The other persons appearing in the image/video (persons that are not the owner/uploader of the image/video), have little to no editorial control over the images/videos. Thus, a person's face can appear in images/videos shared/uploaded by others in the public space (e.g., on social media or video sharing platforms), sometimes even without the person knowing that his/her face appears in those images/videos, thereby compromising the person's identify/privacy. This can happen accidentally (e.g., in the case of touristic photos) or on purpose (e.g., when revealing/compromising the person's identity is aimed). More generally, this problem arises because the person only has control over images/videos that the person shares/uploads and does not have editorial control over images/videos shared/uploaded by others.

The present disclosure describes a blockchain based facial anonymization system that allows may allow users and media platforms to register for facial anonymization. The blockchain based facial anonymization system may automatically anonymize the faces of registered users that are detected in media content provided by the registered media platforms. The blockchain based facial anonymization system may be implemented using one or more smart contracts stored in a blockchain to provide autonomous, transparent, and verifiable facial anonymization. An embodiment is a method by one or more network devices executing one or more smart contracts stored in a blockchain for anonymizing faces appearing in digital media content. The method includes obtaining, for each of a plurality of users registered for facial anonymization, a facial model associated with that user and a profile of that user, where the facial model associated with that user is a computing model usable for detecting a face of that user, obtaining digital media content provided by a media platform registered for facial anonymization, and detecting one or more faces appearing in the digital media content. The method may further include performing the following operations for each of the one or more detected faces: generating a profile of that detected face, determining, from the plurality of users, one or more users that have a profile that matches the profile of that detected face, determining whether that detected face matches the face of any of the determined one or more users based on applying, to that detected face, one or more of the facial models associated with the determined one or more users, anonymizing that detected face to generate an anonymized face in response to a determination that that detected face matches the face of one of the determined one or more users, and providing the anonymized face to the media platform to allow the media platform to publish the media content with the anonymized face. Various embodiments are further described herein below with reference to the accompanying figures.

Figure 1:
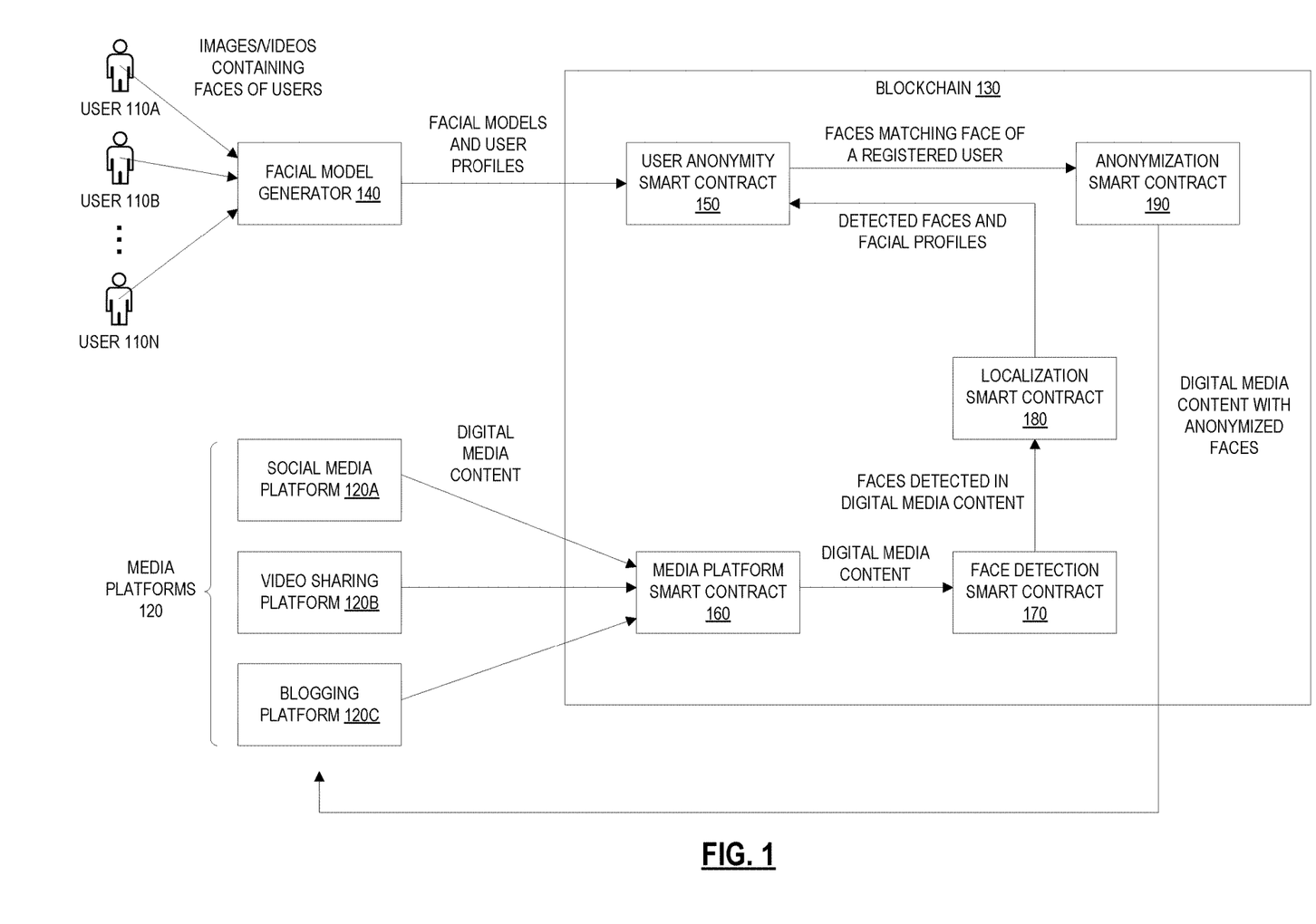
FIG. 1 is a block diagram of a blockchain based facial anonymization system, according to some embodiments.

FIG. 1 is a block diagram of a blockchain based facial anonymization system, according to some embodiments. As shown in the diagram, the system includes users 110A-N, media platforms 120A-120C, and a blockchain 130. The users 110 may correspond to persons that wish to have their faces anonymized in public digital media content (e.g., digital images and/or digital videos). As will be described further herein, the users 110 may register for facial anonymization to request that their faces be anonymized in digital media content provided by registered media platforms 120. The media platforms 120 are platforms that allow public sharing of digital media content. As shown in the diagram, the media platforms 120 include a social media platform 120A (e.g., Facebook®, Twitter®, Instagram®, etc.), a video sharing platform 120B (e.g., YouTube®, Vimeo®, etc.), and a blogging platform 120C (e.g., WordPress®, Blogger®, etc.). It should be understood, however, that the media platforms 120 can include other types of platforms than those shown in the diagram (e.g., public camera platforms). As will be described further herein, the media platforms 120 may register for facial anonymization to agree to provide digital media content that is to be anonymized.

The facial model generator 140 may generate facial models associated with users that are interested in facial anonymization. As used herein, a facial model associated with a user is a computing model usable for detecting the face of that user in digital media content. As used herein, digital media content refers to any media that is encoded in a machine-readable format such as digital images and digital videos. The facial model generator 140 may generate a facial model associated with a user based on receiving digital images/videos containing the face of the user as training input and applying machine learning techniques on the training input. Examples of machine learning techniques that can be used to train/generate a facial model associated with a user include, but are not limited to, convolutional neural network algorithms and support vector machine algorithms. In one embodiment, the facial model generator 140 may use systems such as FaceNet, DeepFace, OpenFace, or similar systems to generate a facial model associated with a user. In one embodiment, the facial model generator 140 is implemented as a mobile application that can be installed on a user's mobile device (e.g., a smartphone, tablet, or laptop). The mobile application may provide a user interface that allows the user to input/select digital images/videos containing the face of the user (e.g., from various different angles) to the mobile application as training input. The mobile application may apply machine learning technique(s) (such as those mentioned above) to the training input to generate a facial model associated with the user which can be used to detect the face of the user in digital media content. Thus, users 110 may download the mobile application to their respective mobile devices and use the mobile application to generate a facial model. Additionally or alternatively, in one embodiment, the facial model generator 140 is implemented as a server to which users can upload digital images/videos containing their faces. The server may receive digital images/videos containing the face of a user as training input and apply machine learning technique(s) to the training input to generate a facial model associated with the user which can be used to detect the face of the user in digital media content. Thus, users 110 may upload digital images/videos containing their faces to the server (e.g., via a secure website or Application Programming Interface (API)) and the server may generate facial models associated with the respective users.

The blockchain 130 is a growing list of records, called "blocks," that are linked using cryptography. The blockchain 130 may store smart contracts which allow for the performance of credible transactions/operations without third party intermediaries, where the transactions/operations are trackable and irreversible. As shown in the diagram, the blockchain 130 stores a user anonymity smart contract 150, a media platform smart contract 160, a face detection smart contract 170, a localization smart contract 180, and an anonymization smart contract 190. These smart contracts may each include computer-executable code that can be executed by one or more network devices implementing the blockchain 130. As will be described in further detail herein, the smart contracts may be executed to anonymize faces of registered users appearing in digital media content provided by the registered media platforms. In one embodiment, the smart contracts are Ethereum smart contracts written in the Solidity programming language (which are then compiled to lower-level byte code that is run in a Ethereum Virtual Machine (EVM)). It should be understood, however, that other types of smart contracts can be used, and that the smart contracts can be written in other types of programming languages. Also, while the diagram shows the facial anonymization functionality being implemented using five separate smart contracts (e.g., to provide modularity), it should be understood that the same/similar functionality can be implemented using fewer or more smart contracts than shown (e.g., the functionality of two or more of the smart contracts can be combined into a single smart contract or the functionality of a single smart contract can be divided amongst multiple smart contracts).

The user anonymity smart contract 150 may include computer-executable code to allow a user 110 to register for facial anonymization. The user anonymity smart contract 150 may also include computer-executable code to receive a facial model associated with the user 110 (e.g., that was generated by the facial model generator 140) and a profile of the user. The profile of the user may include attribute values corresponding to one or more attributes of the user such as the age group of the user (e.g., teens, twenties, thirties, forties, etc.), the gender of the user (e.g., male or female), the skin color of the user, and/or the location of the user.

The media platform smart contract 160 may include computer-executable code to allow a media platform 120 to register for facial anonymization. The media platform smart contract 160 may also include computer-executable code to receive digital media content provided by the media platform 120 that is to be anonymized and to provide the received digital media content to the face detection smart contract 170.

The face detection smart contract 170 may include computer-executable code to receive digital media content provided by a media platform 120 (e.g., via the media platform smart contract 160 or directly from the media platform 120 itself) and to detect faces appearing in the digital media content. Faces may be detected in digital media content using any type of facial detection algorithm. Examples of facial detection algorithms that can be used include, but are not limited to, Haar-cascade algorithms, Eigenfaces algorithms, Fisherfaces algorithms, local binary patterns algorithms, and convolutional neural network algorithms. The face detection smart contract 170 may also include computer-executable code to send the detected faces to the localization smart contract 180. In one embodiment, the faces detected in digital media content are cropped from the digital media content and the cropped faces are sent to the localization smart contract 180 for further processing (cropping the faces reduces the amount of data that is sent/processed compared to sending/processing entire images/videos). In another embodiment, the detected faces are sent to the localization smart contract by sending data regarding the faces to the localization smart contract 180 without cropping the faces from the digital media content (e.g., by specifying the locations of faces detected in the digital media content, for example, using bounded boxes).

The localization smart contract 180 may include computer-executable code to receive the faces detected in digital media content (e.g., from the face detection smart contract 170) and to generate profiles for the detected faces. The profile of a detected face may include one or more attribute values corresponding to one or more attributes of the detected face. The attributes of a detected face may be the same or overlap with the attributes that are included in the user profiles. For example, the attributes of a detected face may include the age group of the detected face (e.g., teens, twenties, thirties, forties, etc.), the gender of the detected face (e.g., male or female), the skin color of the detected face, and/or the location of the detected face. The attribute values of a detected face can be determined based on applying one or more computing models to the detected faces that are trained using machine learning techniques to specifically determine those attribute values (e.g., computing models that are trained to detect the age group of a face, to detect the gender of a face, etc.). In one embodiment, each of the attribute values is assigned a confidence level indicating the confidence of the classification/determination made using the computing model (e.g., 80% confidence that the detected face is in the twenties age group). The localization smart contract 180 may also include computer-executable code to send the detected faces and the profiles of the detected faces to the user anonymity smart contract 150. As will be further described herein, the profiles of the detected faces can be used to reduce the search space of facial models that are applied to the detected face.

The user anonymity smart contract 150 may include computer-executable code to receive a detected face and a profile of the detected face from the localization smart contract 180. The user anonymity smart contract 150 may also include computer-executable code to determine which of the registered users have a profile that matches the profile of the detected face and to determine whether the detected face matches the face of any of those users based on applying the facial models associated with those users to the detected face. For example, if the profile of the detected face includes attribute values indicating that the detected face is a female in her twenties with darker skin color, then the detected face would be matched against faces of users having the same/similar profile. This helps with reducing the search space of facial models that are applied to the detected face, which allows for lower computational costs and faster matching. In one embodiment, only attribute values of the detected face that have a confidence level above a threshold level are used to determine which of the registered users have a profile that matches the profile of the detected face. If the detected face does not match the face of any of the users having a profile that matches the profile of the detected face, then it is determined whether the detected face matches the face of any of the other remaining registered users (based on applying the facial models associated with those other users to the detected face). The user anonymity smart contract 150 may also include computer-executable code to send the detected face to the anonymization smart contract 190 if it is determined that the detected face matches the face of a registered user.

The anonymization smart contract 190 may include computer-executable code to receive a face that is to be anonymized (e.g., from the user anonymity smart contract 150) and to anonymize the face. The face may be anonymized, for example, by pixelating/blurring the face, replacing the face with a synthetic face, blending the face with a background scene, or otherwise hiding the face. The anonymization smart contract 190 may also include computer-executable code to provide the anonymized face to the media platform 120 (that provided the digital media content that contained the face) to allow the media platform to publish the digital media content with the anonymized face. In one embodiment, the anonymized face is provided to the media platform 120 in cropped form and the media platform is responsible for "stitching" the anonymized face to the original location/time within the digital media content. Alternatively or additionally, in one embodiment, the anonymization smart contract 190 includes computer-executable code to stitch the anonymized face to its original location/time within the digital media content and to provide the digital media content that includes the anonymized face stitched therein to the media platform 120.

There are certain use cases that may require special processing. One use case that may require special processing is when a user wishes to appear in certain digital media content while not appearing in other digital media content. This may be the case, for example, if a user appears in advertisements. In such a case, it is likely that the user will not want to be anonymized in the advertisements while being anonymized in other (non-advertisement) digital media content. To allow such use cases, the system may provide a user with the option (e.g., during registration or after registration) to specify certain conditions under which the user's face is anonymized in digital media content. For example, the system may allow a user to specify that facial anonymization should be disabled for the user in digital media content identified as being advertisements. If the user specifies that facial anonymization should be disabled for advertisements, the system may then refrain from anonymizing the user's face if the user's face appears in digital media content identified as being an advertisement. Another use case that may require special processing is when a user's face closely resembles another user's face. This could lead to two (or more) facial models identifying the same face in digital media content, which may cause the wrong face to be anonymized without user consent. To address such cases, the system may provide an option for conflict resolution. For example, the system may allow the user to specify the actions to take in such cases. The action could be to ignore or to notify the occurrence to the user. If the user is notified of such an occurrence, the system may allow the user to provide remarks relating to the digital media content (e.g., location, known people (if they appear in the digital media content), etc.), which can be conveyed to the registered media platform, which will be able to verify and subsequently decide whether to proceed with anonymization or not. For example, the registered media platform may act as a mediator by deciding whether to proceed with anonymization or not based on matching the metadata of the digital media content with the verification remarks. In the rare case where the match is inconclusive then the registered media platform may decide to keep the anonymization.

Embodiments disclosed herein provide several benefits. One benefit is that embodiments can automatically and autonomously (e.g., without involving a third party intermediary) anonymize faces of registered users appearing in digital media content provided by registered media platforms. Thus, a user can have his/her face anonymized in digital media content even if that digital media content is not owned/shared/uploaded by the user. Another benefit of embodiments disclosed herein is that they are able to anonymize the face of a user appearing in digital media content provided by a media platform even if the user is not a user of the media platform (as long as the user and the media platform are both registered with the blockchain based facial anonymization system). Another benefit of embodiments disclosed herein is that they provide transparency by virtue of being implemented using smart contracts stored in a blockchain. Both the users and the media platforms may have access to the smart contracts stored in the blockchain (and thus the specification/behavior of those smart contracts are known to the users and the media platforms), which instills trust among the parties. Another benefit of embodiments disclosed herein is that they provide verifiable results. The use of smart contracts and blockchain ensures that the facial anonymization process is always verified through proof-of-work or other type of consensus mechanism.

Also, as mentioned above, the localization aspect helps with reducing the search space of facial models that are applied to the detected face, which allows for lower computational costs and faster matching. However, it should be noted that the blockchain based facial anonymization system can be implemented without the localization aspect, although such an embodiment may generally have higher computational costs and longer match times compared to embodiments that implement localization.

Figure 2:
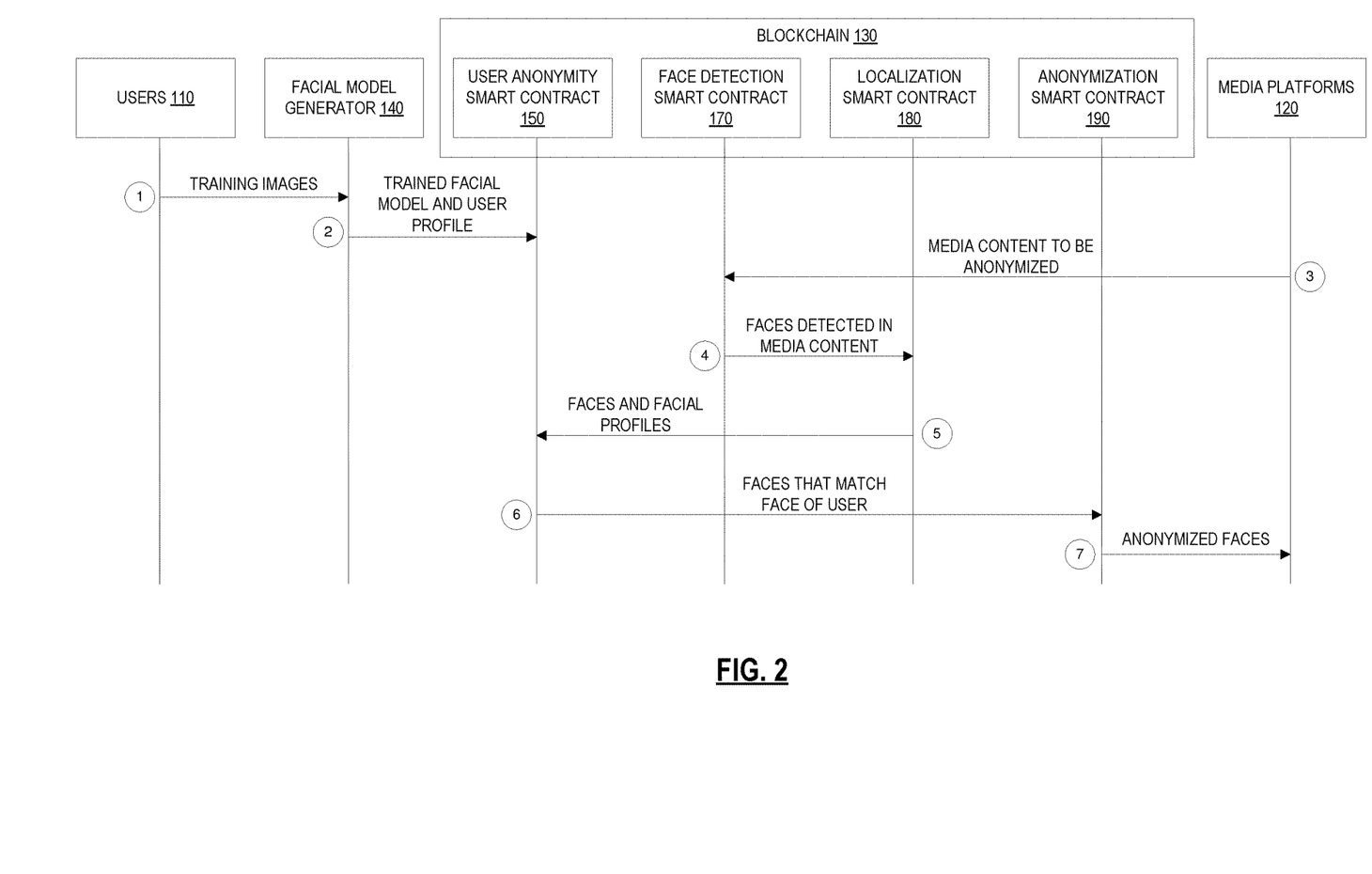
FIG. 2 is a diagram illustrating interactions between components of a blockchain based facial anonymization system, according to some embodiments.

FIG. 2 is a diagram illustrating interactions between components of a blockchain based facial anonymization system, according to some embodiments. At circle '1' user 110 provides training images (e.g., digital images containing the face of the user at different angles) to the facial model generator 140. The user 110 may also provide a profile of the user to the facial model generator 140. At circle '2' the facial model generator 140 generates a facial model associated with the user 110 and send this facial model, along with the profile of the user 110, to the user anonymity smart contract 150. At circle '3' the media platform 120 provides digital media content to be anonymized to the face detection smart contract 170. At circle '4' the face detection smart contract 170 detects faces appearing in the media content and sends the detected faces to the localization smart contract 180. At circle '5' the localization smart contract generates profiles for the detected faces and sends the detected faces and the profiles of the detected faces to the user anonymity smart contract 150. At circle '6' the user anonymity smart contract 150 applies the facial models associated with registered users to the detected faces to determine which, if any, of the detected faces match the face of a registered user. To reduce the search space of facial models that need to be applied to a detected face, the user anonymity smart contract 150 may determine which of the registered users have a profile that matches the profile of the detected face and apply the facial models associated with those users to the detected face. The user anonymity smart contract 150 may expand the search space (e.g., to include the facial models of registered users that do not have a profile that matches the profile of the detected face or otherwise have a less compatible profile match) if the detected face does not match the face of any of those users. The user anonymity smart contract 150 may then send those of the detected faces that match the face of the user 110 (or the face of any of the other registered users) to the anonymization smart contract 190. At circle '7' the anonymization smart contract 190 anonymizes the detected faces and sends the anonymized faces to the media platform 120.

Figure 3:
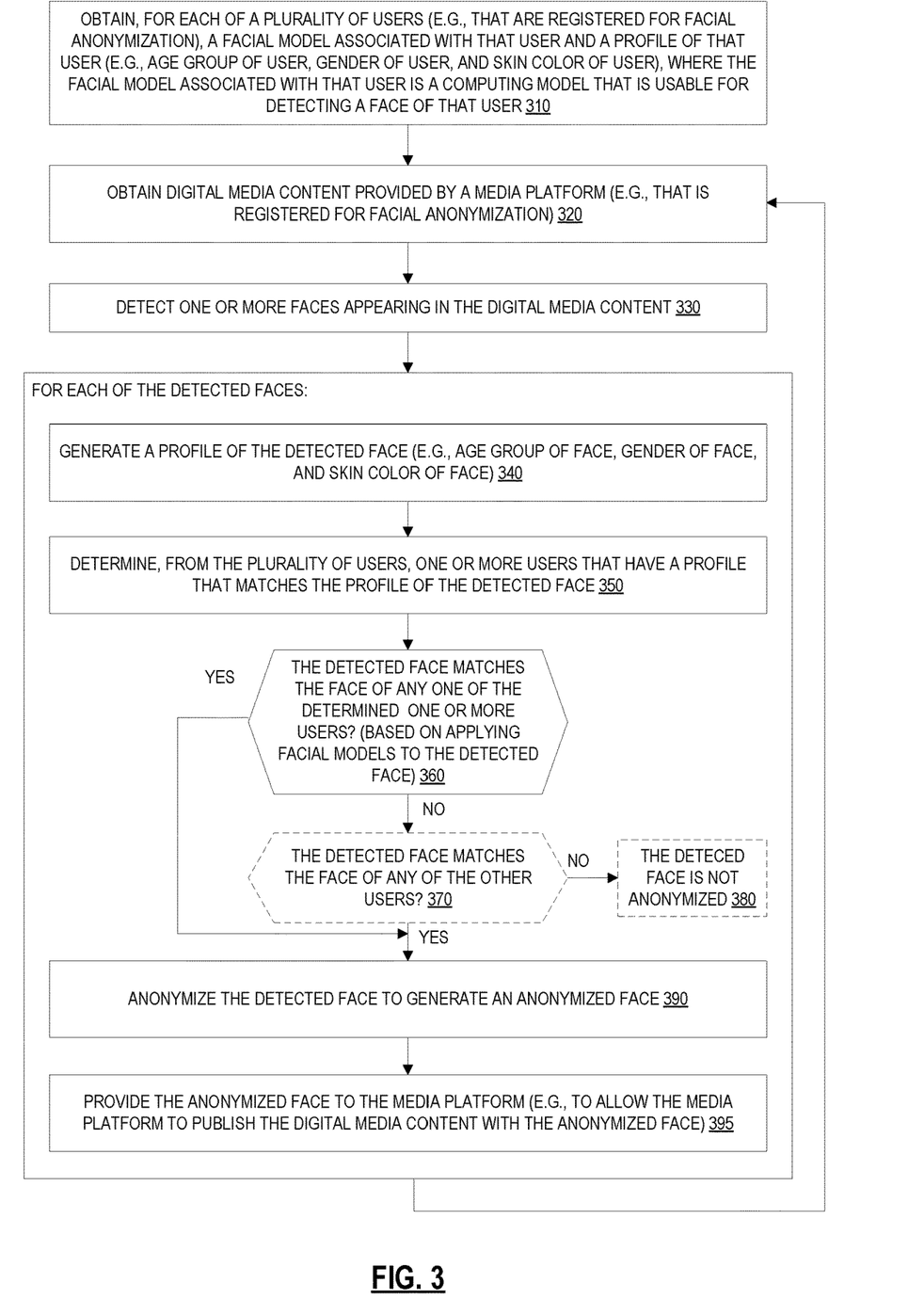
FIG. 3 is a flow diagram of a process for anonymizing faces appearing in digital media content, according to some embodiments.

FIG. 3 is a flow diagram of a process for anonymizing faces appearing in digital media content, according to some embodiments. In one embodiment, the process is implemented by one or more network devices executing one or more smart contracts stored in a blockchain. The process may be implemented using hardware, software, firmware, or any combination thereof. The operations in the flow diagrams will be described with reference to the exemplary embodiments of the other figures. However, it should be understood that the operations of the flow diagrams can be performed by embodiments other than those discussed with reference to the other figures, and embodiments discussed with reference to these other figures can perform operations different than those discussed with reference to the flow diagrams.

In one embodiment, the one or more network devices registers a user for facial anonymization in response to receiving a request from the user to register for facial anonymization, where an indication that the user is registered for facial anonymization is stored in the blockchain. The one or more network devices may also register a media platform for facial anonymization in response to receiving a request from the media platform to register for facial anonymization, where an indication that the media platform is registered for facial anonymization is stored in the blockchain.

At block 310, the one or more network devices obtain, for each of a plurality of users (e.g., that are registered for facial anonymization), a facial model associated with that user and a profile of that user (e.g., which includes the age group of the user, the gender of the user, and/or the skin color of the user), where the facial model associated with that user is a computing model that is usable for detecting a face of that user in digital media content. In one embodiment, each of the plurality of users is registered for facial anonymization.

At block 320, the one or more network devices obtain digital media content provided by a media platform (e.g., that is registered for facial anonymization). In one embodiment, the media platform is a social media platform, a video sharing platform, a blog platform, or a public camera platform (or any combination thereof). In one embodiment, the media platform is registered for facial anonymization. In one embodiment, the media platform is one of a plurality of media platforms registered for facial anonymization. In one embodiment, the digital media content includes a digital image or digital video uploaded to the media platform by a user of the media platform. In one embodiment, at least one user from the plurality of users is not a user of the media platform (e.g., does not have an account with the media platform).

At block 330, the one or more network devices detect one or more faces appearing in the digital media content. For each of the detected faces, the one or more network devices perform blocks 340-395. At block 340, the one or more network devices generate a profile of the detected face (e.g., which includes the age group of the detected face, the gender of the detected face, and/or the skin color of the detected face). At block 350, the one or more network devices determine, from the plurality of users, one or more users that have a profile that matches the profile of the detected face. In one embodiment, the profile of a given one of the plurality of users and the profile of a given one of the one or more detected faces each includes one or more attribute values corresponding to one or more attributes, where the profile of the given user is determined to match the profile of the given detected face if the one or more attribute values included in the profile of the given user matches the corresponding attribute values included in the profile of the given detected face. In one embodiment, the one or more attributes include one or more of: age group, gender, skin color, and location.

At decision block 360, the one or more network devices determine whether the detected face matches the face of any one of the determined one or more users (based on applying facial models associated with the determined one or more users to the detected face). If the detected face matches the face of any one of the determined one or more users, then the process proceeds to block 390 where the one or more network devices anonymize the detected face to generate an anonymized face. In one embodiment, a given one of the detected faces is anonymized by pixelating/blurring the given detected face, replacing the given detected face with a synthetic face, or blending the given detected face with a background scene included in the digital media content. At block 395, the one or more network devices provide the anonymized face to the media platform (e.g., to allow the media platform to publish the digital media content with the anonymized face). Returning to decision block 360, if the one or more network devices determines that the detected face does not match the face of any of the determined one or more users, then the process proceeds to decision block 370. At decision block 370, the one or more network devices determine whether the detected face matches the face of any one of the other users. If the detected face matches the face of any one of the other users, then the process proceeds to block 390 where the one or more network devices anonymize the detected face to generate an anonymized face. At 395, the one or more network devices provide the anonymized face to the media platform. Returning to decision block 370, if the one or more network devices determine that the detected face does not match the face of any of the other users, then the process proceeds to block 380 where it is determined that the detected face is not to be anonymized.

If the one or more network device finish processing the group of detected faces, the process proceeds to block 320 where the one or more network devices obtain, from the media platform, additional digital media content that is to be anonymized. The one or more network devices may repeat blocks 330-395 to process the additional digital media content in a similar manner as described above.

Figure 4A:
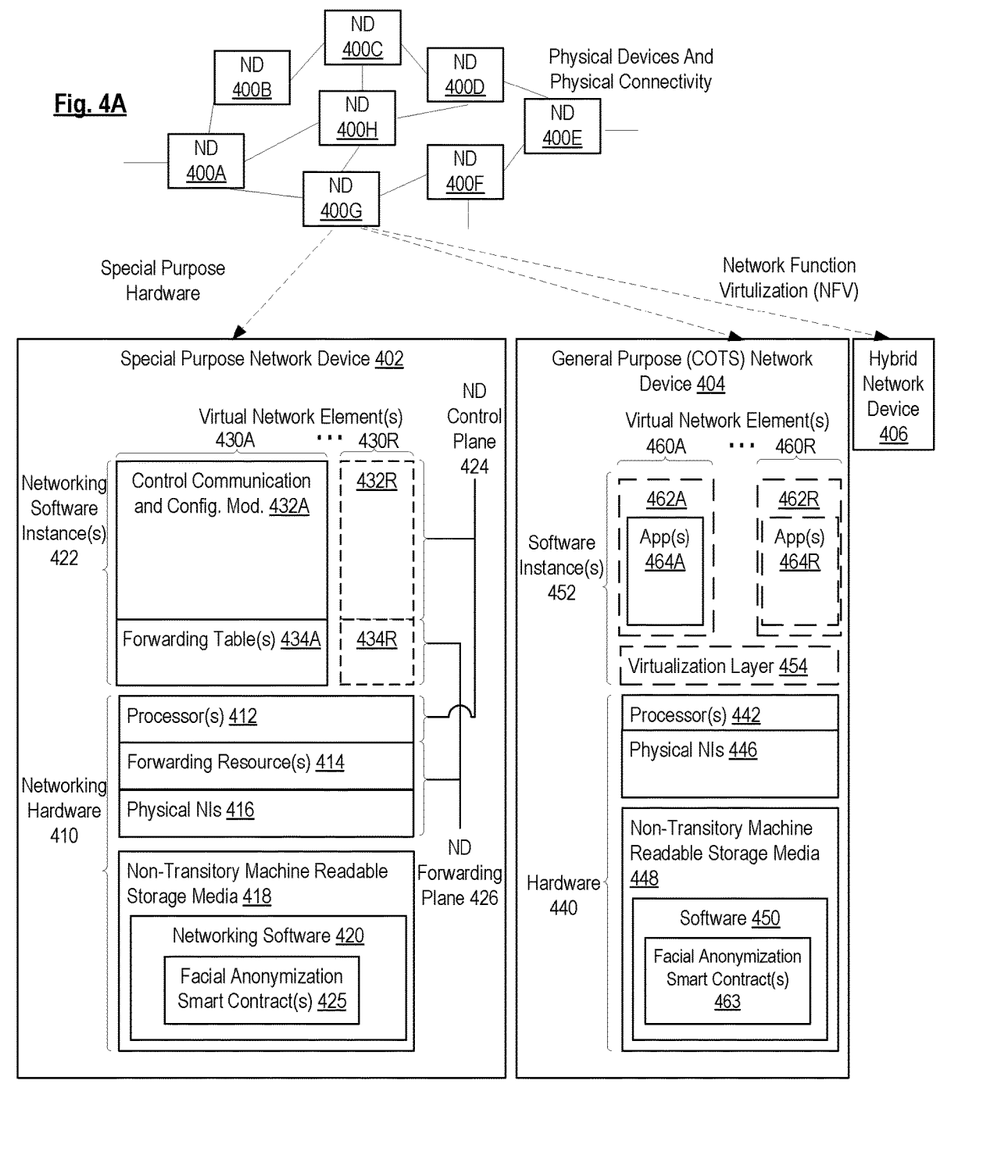
FIG. 4A illustrates connectivity between network devices (NDs) within an exemplary network, as well as three exemplary implementations of the NDs, according to some embodiments.

FIG. 4A illustrates connectivity between network devices (NDs) within an exemplary network, as well as three exemplary implementations of the NDs, according to some embodiments. FIG. 4A shows NDs 400A-H, and their connectivity by way of lines between 400A-400B, 400B-400C, 400C-400D, 400D-400E, 400E-400F, 400F-400G, and 400A-400G, as well as between 400H and each of 400A, 400C, 400D, and 400G. These NDs are physical devices, and the connectivity between these NDs can be wireless or wired (often referred to as a link). An additional line extending from NDs 400A, 400E, and 400F illustrates that these NDs act as ingress and egress points for the network (and thus, these NDs are sometimes referred to as edge NDs; while the other NDs may be called core NDs).

Two of the exemplary ND implementations in FIG. 4A are: 1) a special-purpose network device 402 that uses custom application—specific integrated—circuits (ASICs) and a special-purpose operating system (OS); and 2) a general purpose network device 404 that uses common off-the-shelf (COTS) processors and a standard OS.

The special-purpose network device 402 includes networking hardware 410 comprising a set of one or more processor(s) 412, forwarding resource(s) 414 (which typically include one or more ASICs and/or network processors), and physical network interfaces (NIs) 416 (through which network connections are made, such as those shown by the connectivity between NDs 400A-H), as well as non-transitory machine readable storage media 418 having stored therein networking software 420. During operation, the networking software 420 may be executed by the networking hardware 410 to instantiate a set of one or more networking software instance(s) 422. Each of the networking software instance(s) 422, and that part of the networking hardware 410 that executes that network software instance (be it hardware dedicated to that networking software instance and/or time slices of hardware temporally shared by that networking software instance with others of the networking software instance(s) 422), form a separate virtual network element 430A-R. Each of the virtual network element(s) (VNEs) 430A-R includes a control communication and configuration module 432A-R (sometimes referred to as a local control module or control communication module) and forwarding table(s) 434A-R, such that a given virtual network element (e.g., 430A) includes the control communication and configuration module (e.g., 432A), a set of one or more forwarding table(s) (e.g., 434A), and that portion of the networking hardware 410 that executes the virtual network element (e.g., 430A).

Software 420 can include code such as facial anonymization smart contract(s) 425 (which may include one or more of user anonymity smart contract 150, media platform smart contract 160, face detection smart contract 170, localization smart contract 180, and anonymization smart contract 190), which when executed by networking hardware 510, causes the special-purpose network device 402 to perform operations of one or more embodiments described herein above as part networking software instances 422 (e.g., to provide blockchain based facial anonymization functionality described herein).

The special-purpose network device 402 is often physically and/or logically considered to include: 1) a ND control plane 424 (sometimes referred to as a control plane) comprising the processor(s) 412 that execute the control communication and configuration module(s) 432A-R; and 2) a ND forwarding plane 426 (sometimes referred to as a forwarding plane, a data plane, or a media plane) comprising the forwarding resource(s) 414 that utilize the forwarding table(s) 434A-R and the physical NIs 416. By way of example, where the ND is a router (or is implementing routing functionality), the ND control plane 424 (the processor(s) 412 executing the control communication and configuration module(s) 432A-R) is typically responsible for participating in controlling how data (e.g., packets) is to be routed (e.g., the next hop for the data and the outgoing physical NI for that data) and storing that routing information in the forwarding table(s) 434A-R, and the ND forwarding plane 426 is responsible for receiving that data on the physical NIs 416 and forwarding that data out the appropriate ones of the physical NIs 416 based on the forwarding table(s) 434A-R.

Figure 4B:
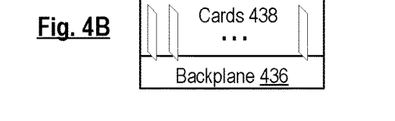
FIG. 4B illustrates an exemplary way to implement a special-purpose network device, according to some embodiments.

FIG. 4B illustrates an exemplary way to implement the special-purpose network device 402 according to some embodiments. FIG. 4B shows a special-purpose network device including cards 438 (typically hot pluggable). While in some embodiments the cards 438 are of two types (one or more that operate as the ND forwarding plane 426 (sometimes called line cards), and one or more that operate to implement the ND control plane 424 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 436 (e.g., a first full mesh coupling the line cards and a second full mesh coupling all of the cards).

Returning to FIG. 4A, the general purpose network device 404 includes hardware 440 comprising a set of one or more processor(s) 442 (which are often COTS processors) and physical NIs 446, as well as non-transitory machine readable storage media 448 having stored therein software 450. During operation, the processor(s) 442 execute the software 450 to instantiate one or more sets of one or more applications 464A-R. While one embodiment does not implement virtualization, alternative embodiments may use different forms of virtualization. For example, in one such alternative embodiment the virtualization layer 454 represents the kernel of an operating system (or a shim executing on a base operating system) that allows for the creation of multiple instances 462A-R called software containers that may each be used to execute one (or more) of the sets of applications 464A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 454 represents a hypervisor (sometimes referred to as a virtual machine monitor (VMM)) or a hypervisor executing on top of a host operating system, and each of the sets of applications 464A-R is run on top of a guest operating system within an instance 462A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikemel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 440, directly on a hypervisor (in which case the unikernel is sometimes described as running within a LibOS virtual machine), or in a software container, embodiments can be implemented fully with unikernels running directly on a hypervisor represented by virtualization layer 454, unikernels running within software containers represented by instances 462A-R, or as a combination of unikernels and the above-described techniques (e.g., unikernels and virtual machines both run directly on a hypervisor, unikernels and sets of applications that are run in different software containers).

The instantiation of the one or more sets of one or more applications 464A-R, as well as virtualization if implemented, are collectively referred to as software instance(s) 452. Each set of applications 464A-R, corresponding virtualization construct (e.g., instance 462A-R) if implemented, and that part of the hardware 440 that executes them (be it hardware dedicated to that execution and/or time slices of hardware temporally shared), forms a separate virtual network element(s) 460A-R.

The virtual network element(s) 460A-R perform similar functionality to the virtual network element(s) 430A-R—e.g., similar to the control communication and configuration module(s) 432A and forwarding table(s) 434A (this virtualization of the hardware 440 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments are illustrated with each instance 462A-R corresponding to one VNE 460A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 462A-R to VNEs also apply to embodiments where such a finer level of granularity and/or unikernels are used.

In certain embodiments, the virtualization layer 454 includes a virtual switch that provides similar forwarding services as a physical Ethernet switch. Specifically, this virtual switch forwards traffic between instances 462A-R and the physical NI(s) 446, as well as optionally between the instances 462A-R; in addition, this virtual switch may enforce network isolation between the VNEs 460A-R that by policy are not permitted to communicate with each other (e.g., by honoring virtual local area networks (VLANs)).

Software 450 can include code such as facial anonymization smart contract(s) 463 (which may include one or more of user anonymity smart contract 150, media platform smart contract 160, face detection smart contract 170, localization smart contract 180, and anonymization smart contract 190), which when executed by processor(s) 442, cause the general purpose network device 404 to perform operations of one or more embodiments described herein above as part software instances 462A-R (e.g., to provide the blockchain based facial anonymization functionality described herein).

The third exemplary ND implementation in FIG. 4A is a hybrid network device 406, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 402) could provide for para-virtualization to the networking hardware present in the hybrid network device 406.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 430A-R, VNEs 460A-R, and those in the hybrid network device 406) receives data on the physical NIs (e.g., 416, 446) and forwards that data out the appropriate ones of the physical NIs (e.g., 416, 446). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments are not described with reference to any particular programming language. It will be appreciated that a variety of programming languages may be used to implement the teachings of embodiments as described herein.

An embodiment may be an article of manufacture in which a non-transitory machine-readable storage medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method by one or more network devices executing one or more smart contracts stored in a blockchain for anonymizing faces appearing in digital media content, the method comprising:
    obtaining, for each of a plurality of users, a facial model associated with that user and a profile of that user, wherein the facial model associated with that user is a computing model usable for detecting a face of that user, wherein the profile of that user includes a plurality of attribute values of that user;
    obtaining digital media content provided by a media platform;
    detecting one or more faces appearing in the digital media content; and
    for each of the one or more detected faces:
        generating a profile of that detected face that includes a plurality of attribute values of that detected face,
        determining, from the plurality of users, one or more users that have a profile that matches the profile of that detected face based on comparing the plurality of attribute values of that detected face with corresponding attribute values of the plurality of users included in profiles of the plurality of users,
        determining whether that detected face matches the face of any of the determined one or more users based on applying, to that detected face, one or more of the facial models associated with the determined one or more users,
        anonymizing that detected face to generate an anonymized face in response to a determination that that detected face matches the face of one of the determined one or more users, and
        providing the anonymized face to the media platform.

2. The method of claim 1, wherein a detected face of the one or more detected faces is cropped from the digital media content before being anonymized.

3. The method of claim 1, wherein the plurality of attribute values of that detected face corresponds to a plurality of attributes, wherein the plurality of attributes includes one or more of: age group, gender, skin color, and location.

4. The method of claim 1, wherein at least one user from the plurality of users is not a user of the media platform.

5. The method of claim 1, wherein the digital media content includes a digital image or digital video uploaded to the media platform by a user of the media platform.

6. The method of claim 1, wherein each of the plurality of users is registered for facial anonymization and wherein the media platform is registered for facial anonymization.

7. The method of claim 6, further comprising:
    registering a user for facial anonymization in response to receiving a request from the user to register for facial anonymization, wherein an indication that the user is registered for facial anonymization is stored in the blockchain; and
    registering the media platform for facial anonymization in response to receiving a request from the media platform to register for facial anonymization, wherein an indication that the media platform is registered for facial anonymization is stored in the blockchain.

8. The method of claim 6, wherein the media platform is one of a plurality of media platforms registered for facial anonymization.

9. The method of claim 1, wherein a given one of the detected faces is anonymized by pixelating the given detected face, replacing the given detected face with a synthetic face, or blending the given detected face with a background scene included in the digital media content.

10. The method of claim 1, wherein the media platform is a social media platform, a video sharing platform, a blog platform, or a public camera platform.

11. A network device configured to execute one or more smart contracts stored in a blockchain to anonymize faces appearing in digital media content, the network device comprising:
a set of one or more processors; and
a non-transitory machine-readable storage medium having stored therein the one or more smart contracts, which when executed by the set of one or more processors, causes the network device to:
obtain, for each of a plurality of users, a facial model associated with that user and a profile of that user, wherein the facial model associated with that user is a computing model usable for detecting a face of that user, wherein the profile of that user includes a plurality of attribute values of that user,
obtain digital media content provided by a media platform,
detect one or more faces appearing in the digital media content, and
for each of the one or more detected faces:
generate a profile of that detected face that includes a plurality of attribute values of that detected face,
determine, from the plurality of users, one or more users that have a profile that matches the profile of that detected face based on comparing the plurality of attribute values of that detected face with corresponding attribute values of the plurality of users included in profiles of the plurality of users,
determine whether that detected face matches the face of any of the determined one or more users based on applying, to that detected face, one or more of the facial models associated with the determined one or more users,
anonymize that detected face to generate an anonymized face in response to a determination that that detected face matches the face of one of the determined one or more users, and
provide the anonymized face to the media platform.

12. The network device of claim 11, wherein a detected face of the one or more detected faces is cropped from the digital media content before being anonymized.

13. The network device of claim 11, wherein the plurality of attribute values of that detected face corresponds to a plurality of attributes, wherein the plurality of attributes includes one or more of: age group, gender, skin color, and location.

14. The network device of claim 11, wherein at least one user from the plurality of users is not a user of the media platform.

15. The network device of claim 11, wherein the digital media content includes a digital image or digital video uploaded to the media platform by a user of the media platform.

16. A non-transitory machine-readable storage medium having one or more smart contracts stored therein, which when executed by a set of one or more processors of one or more network devices implementing a blockchain, causes the one or more network devices to perform operations for anonymizing faces appearing in digital media content, the operations comprising:
obtaining, for each of a plurality of users, a facial model associated with that user and a profile of that user, wherein the facial model associated with that user is a computing model usable for detecting a face of that user, wherein the profile of that user includes a plurality of attribute values of that user;
obtaining digital media content provided by a media platform;
detecting one or more faces appearing in the digital media content; and
for each of the one or more detected faces:
generating a profile of that detected face that includes a plurality of attribute values of that detected face,
determining, from the plurality of users, one or more users that have a profile that matches the profile of that detected face based on comparing the plurality of attribute values of that detected face with corresponding attribute values of the plurality of users included in profiles of the plurality of users,
determining whether that detected face matches the face of any of the determined one or more users based on applying, to that detected face, one or more of the facial models associated with the determined one or more users,
anonymizing that detected face to generate an anonymized face in response to a determination that that detected face matches the face of one of the determined one or more users, and
providing the anonymized face to the media platform.

17. The non-transitory machine-readable storage medium of claim 16, wherein at least one user from the plurality of users is not a user of the media platform.

18. The non-transitory machine-readable storage medium of claim 16, wherein each of the plurality of users is registered for facial anonymization and wherein the media platform is registered for facial anonymization.

19. The non-transitory machine-readable storage medium of claim 16, wherein a given one of the detected faces is anonymized by pixelating the given detected face, replacing the given detected face with a synthetic face, or blending the given detected face with a background scene included in the digital media content.

20. The non-transitory machine-readable storage medium of claim 16, wherein the media platform is one of a plurality of media platforms registered for facial anonymization.

* * * * *